Nov. 12, 1929.   C. G. BUTLER   1,734,996
LUBRICATING COUPLING NIPPLE
Filed June 16, 1926
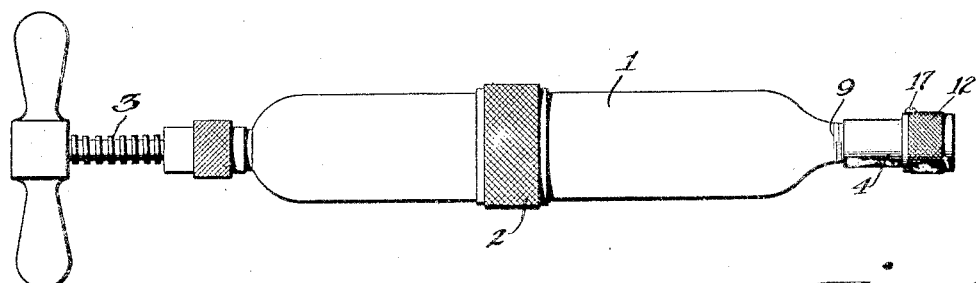
Fig.1
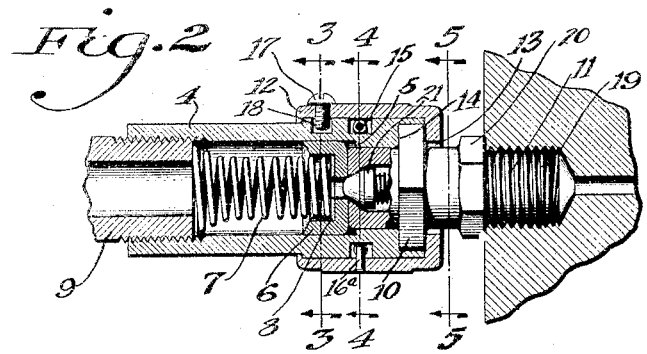
Inventor
Clyde G. Butler
By Wood & Wood
Attorneys Patented Nov. 12, 1929

1,734,996

UNITED STATES PATENT OFFICE

CLYDE G. BUTLER, OF CINCINNATI, OHIO, ASSIGNOR, BY MESNE ASSIGNMENTS, TO ALEMITE CORPORATION, OF CHICAGO, ILLINOIS, A CORPORATION OF DELAWARE

LUBRICATING COUPLING NIPPLE

Application filed June 16, 1926. Serial No. 116,453.

This invention relates to improvements in lubricating apparatus or system in which all the bearings or parts to be lubricated are equipped with a uniform type of coupling attachment or nipple to which the conduit end of a lubricator gun can be quickly and conveniently coupled under a grease tight joint for the purpose of lubrication, and particularly to the construction of coupling attachment or nipple, and coupler connecting therewith.

An object of the invention is to provide a combined nipple and coupling attachment having a polygonal flange which serves as a wrench grip when screwing the nipple in place on the bearing or part to be lubricated, and as a means for making a non-rotative connection with a coupler when engaged therein, and also as a means upon which the coupler can be clasped or anchored against longitudinal displacement or uncoupling withdrawal of the parts.

Another object of the invention is to provide a coupling member for coupling connection with a nipple with a swiveled coupling lock element which provides for a quick and convenient coupling and uncoupling of the parts and when coupled securely locks the parts together.

Other features and objects of the invention are more fully set forth in the description of the accompanying drawings forming a part of this specification, in which:

Figure 1 is a side elevation of a grease pump or gun provided with a coupling member of chuck constructed in accordance with the invention and directly connected to the outlet or discharge conduit of the pump.

Figure 2 is an enlarged central longitudinal section of the coupling member or chuck applied with a coacting nipple of particular design. The nipple is partly shown in section and secured to a bearing or similar part into which the lubricant is to be forced.

Figure 3 is a section on line 3—3, of Figure 2.

Figure 4 is a section on line 4—4, of Figure 2.

Figure 5 is a section on line 5—5, of Figure 2.

Figure 6 is an end view of a modified form of nipple having the outer rectangular flange of a dimention as will admit a socket wrench to be engaged with the hexagonal flange at the inner end of screw thread.

The grease pump or gun 1 may be of any conventional type of construction from which grease can be discharged at an exceedingly high pressure and forced into a bearing or part to be lubricated to which the gun is connected. As the invention is primarily directed to the chuck as a coupling fixture secured to the outlet or discharge conduit of the gun for making quick and efficient connection or coupling with a uniform type of coupling attachments or nipples with which the bearing or parts to be lubricated are equipped, the pump in detail need not be exemplified herein, and likewise as the utility of such lubricating apparatus is well understood in the art no reference need be made in such capacity.

Therefore the pump disclosed is of a hand operated type having a two part cylinder separable for loading purpose and the parts connected by a union sleeve 2. The pump is provided with a plunger or piston (not shown) actuated by a screw-threaded plunger or piston rod 3 engaged into one end of the cylinder, so that as the rod is turned in an appropriate direction the piston is fed forward and the lubricant discharged from the pump at an exceedingly high pressure. The improved coupling or chuck is shown as directly applied upon the end of the pump, it however being recognized that it may be applied upon the end of a flexible conduit or hose connecting with the pump when such facility is required, although one of the advantages of the chuck is in its facility and utility upon the end of a rigid conduit as directly upon the outlet of the pump, to the elimination of a flexible conduit, it being experienced that a flexible conduit is easily susceptible to leaks, especially if unduly flexed.

The chuck or coupler for making a quick and grease-tight connection with a coupling element or nipple comprises a sleeve 4 with the bore thereof at one end thereof screw-threaded for securing the sleeve upon the outlet end of the pump or conduit, and counterbored toward the opposite or head end to provide an internal annular shoulder 5 as a stop for a cup leather packing 6 slidable within the bore of the sleeve 4 and engaged over an end of a compression spring 7 for yieldingly urging the packing to bear against the end or top of a nipple when engaged into the sleeve for effecting a grease tight joint. A metal washer 8 is interposed between the end of the spring and packing to provide a solid seat for the spring. The oposite end of the spring bears against the end of the conduit or pump outlet 9 or may be otherwise secured within the sleeve. The head end of the sleeve is recessed to provide a socket 14 for receiving the squared head or faceted flange 10 of the nipple 11 about which the coupling sleeve 4 is engaged. The rectangular or facet faced configuration of the socket and nipple head provides for a non-rotative union between the parts which offers an advantage to the screw operated type of grease gun, since it relieves the operator from the necessity of forcefully holding the barrel of the gun while rotating the piston rod or screw.

A swivel coupling or lock member 12 is rotatively mounted upon the head end of the sleeve 4 with one end thereof flanged inwardly over the head end of the sleeve 4 to provide an opening 13 corresponding to the outline of the squared head or faceted flange 10 of the nipple 11, and overlaps the corners 14 of the facets when the nipple is engaged or seated into the socket in the head end of the sleeve 4, to lock the parts together against longitudinal displacement or withdrawal. The swivel coupling element 12 swivels upon the head of the sleeve 4 to a degree to register its opening with the socket 14 to permit the insertion or withdrawal of the nipple head into or from the socket. The opposite end of the swivel coupling element 12 is inwardly flanged or turned about the shoulder formed by counterturning the head end of the sleeve 4 to secure the coupling element upon the head end of the sleeve against longitudinal displacement. The head end of the sleeve is annularly grooved to receive a spring 15 one end of which is fixed to the sleeve at 16 and the opposite end to a pin 16ª extending inwardly from the swivel element into the groove, the spring normally holding the swivel member in a position with its face opening 13 out of registry with the socket and to permit the swivel element to be turned for socket registry when applying the coupling or chuck upon a nipple and spring back when the opening frees the facets. To limit the swivel motion of the coupling element 12 a pin or screw 17 is fixed to and projected through the coupling element and into an oblong notch 18 in the periphery of the sleeve 4.

The nipple 11 is of a check valve type provided with a screw-threaded shank portion 19 for attaching the same to the parts to be lubricated, and having a sub-flange 20 at the inner end of the screw-threaded portion for furnishing a bearing face bolt head for tightening the screw-threaded shank portion in attached position. The couping lock flange 10 is also utilized as a wrench fitting portion for attaching or detaching the nipple. It however is obvious to use the flange 20 which is shown as faceted or hexagon in contour for such purpose to avoid marring the edges of the lock flange 10. In many instances it may be desirable to use a nipple of the type shown in Figure 6 wherein the greatest diameter of the coupling flange 10 is less than the least diameter of the wrench engaging flange 20. This construction makes it possible effectively to use a socket wrench for screwing the nipple into the bearing hole of the relatively inaccessible bearing where an ordinary open-end wrench could not be conveniently used.

The inlet end of the nipple is flanged over to provide a seat for a spring pressed ball closure or check valve 21.

To connect the coupling chuck with the nipple, the sleeve 4 is engaged and pressed over the head end of the nipple, and the opening 13 in the end of the swivel sleeve 12 in registry about the coupling flange 10 of the nipple and with a turn of the sleeve 4 or pump conduit the socket 14 is brought into registry with the opening 13 and coupling or lock flange 10 to allow the lock flange 10 to be engaged into the socket, whereupon the swivel sleeve will snap into its normal position clasping the lock flange 10. This enables the operator to very quickly connect or couple the parts through his hold upon the pump, although the operator may grasp the swivel sleeve and manually turn the same to bring its opening into registry with the socket and then press the coupling chuck upon the nipple as is necessary for detaching the coupling. As the chuck is pressed over the nipple the head end of the nipple engages with the perforated cup packing which recedes sufficiently against the spring pressure until the nipple is fully inserted and the lock flange seated within the sleeve socket. The cup is consequently yieldingly held against the top of the nipple, so that when the grease gun is actuated to subject the lubricant therein to pressure, the pressure of the lubricant in addition to the spring holds the cup packing firmly upon the end of the nipple to prevent the escape of lubricant between the contacting surfaces of the packing and nipple. Also the outer force of the compressed lubricant tends to expand the annular flange or cup portion of the packing within the bore of the chuck sleeve or cylinder 4 to prevent the escape of lubricant between the packing and bore surfaces.

The depth of the socket 14 is sufficient freely to receive the locking flange 10 of the nipple so that during the coupling and uncoupling operations the sleeve 12 may easily be rotated by the spring 15 during coupling operations and may readily be manually rotated in a direction opposed to the tension of the spring 15 during the uncoupling operation.

The shape of the socket 14, the opening 13 in the sleeve 12, and the locking flange 10 need not necessarily be square as shown but may be made of any other desired non-circular configuration. The lock flange 10 when utilized in a dual capacity as coupling element and as a wrench head for attaching the nipple, brings the head higher upon the body of the nipple in a more convenient place for wrench grip. The nipple structure is of considerably reduced cost of manufacture over other forms now largely used as aside from the check valve it represents a product easily and quickly turned out upon an automatic screw machine.

Having described my invention, I claim:

1. A coupling comprising a tubular member having a socket in one end thereof, a bore provided with a shoulder, a centrally apertured gasket slidably mounted in the bore of said tubular member, yieldingly urged toward and adapted to normally engage said shoulder, a sleeve concentrically swivelling about the socket end of said tubular member and flanged over the end of said member, providing an opening corresponding to the socket outline, adapted by the swivel motion of the sleeve to be brought into and out of registry with the socket, admitting a head of a nipple to be engaged into said socket and when engaged therein clasped by said sleeve flange, and resilient means connected between said tubular member and said sleeve tending to hold their openings out of registry.

2. The combination with a coupling nipple having a peripherally flanged head and a spring pressed closure, a pump, a tubular coupling member fixed to the outlet conduit end of the pump adapted to be inserted over the head end of said nipple, a coupling element swiveled upon the nipple engaging end of said tubular coupling member, resilient means for automatically rotating said element to clasp the flanged head of said nipple thereby to secure the parts against longitudinal displacement, and a perforated yieldingly urged packing slidable within the bore of said tubular member for engagement against the top of said nipple.

3. A coupling of the character described, comprising a tubular member having a socket end and a centrally apertured packing slidable within the bore thereof, a nipple coupling member provided with a flanged head engaged into the socket end of said tubular member with the flange thereof seating within said socket and the head end of the nipple in bearing engagement with the packing, a coupling lock member swiveled upon said tubular member having an end portion providing an opening for registry and non-registry with said socket at respective alternate swivelling limits of said lock member, for connecting and disconnecting the parts and for clasping the flanged head of said nipple when engaged into said socket for securing the parts together, and resilient means for holding said member in non-registering position with respect to said socket.

4. In a device of the class described, the combination of a conduit adapted to receive lubricant under pressure, a nozzle secured thereto and having a non-circular socket in its outer end, a coupling sleeve swiveled on said nozzle and having an end opening adapted to register with said socket, and a spring tending to rotate said sleeve to a position in which the opening in the end thereof is out of registry with said socket.

In witness whereof, I hereunto subscribe my name.

CLYDE G. BUTLER.